P. C. AVERY.
TANK FOR STORING ACETYLENE GAS.
APPLICATION FILED AUG. 27, 1906.
933,152.
Patented Sept. 7, 1909.
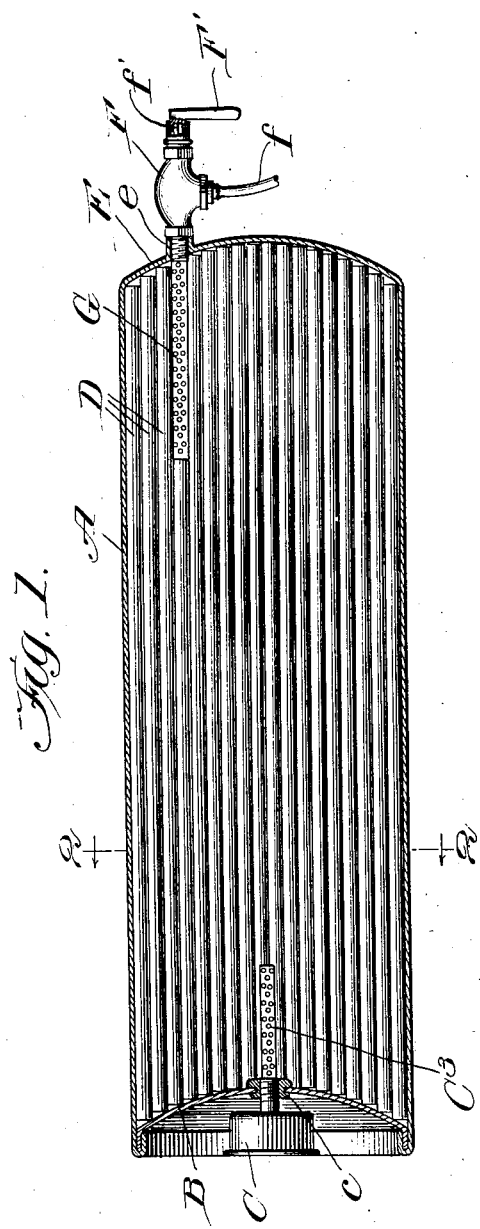
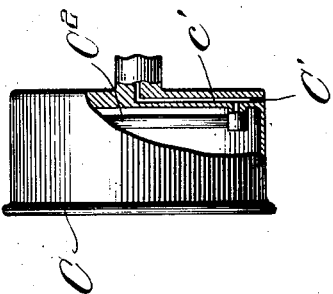
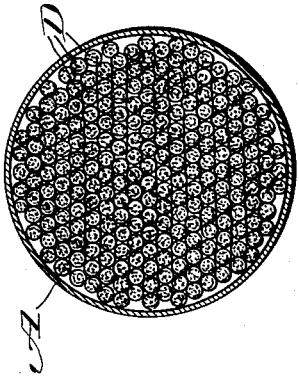
Witnesses:
Harry F. Gaither
Ruby Nash
Inventor:
Percy C. Avery
by Chamberlin Wilkinson
his Attorneys

UNITED STATES PATENT OFFICE.

PERCY C. AVERY, OF MILWAUKEE, WISCONSIN.

TANK FOR STORING ACETYLENE GAS.

933,152.  Specification of Letters Patent.  Patented Sept. 7, 1909.

Application filed August 27, 1906. Serial No. 332,091.

*To all whom it may concern:*

Be it known that I, PERCY C. AVERY, a citizen of the United States, residing at Milwaukee, county of Milwaukee, State of Wisconsin, have invented a certain new and useful Improvement in Tanks for Storing Acetylene Gas, and declare the following to be a full, clear, and exact description of the same, such as will enable others skilled in the art to which it pertains to make and use the same, reference being had to the accompanying drawings, which form a part of this specification.

My invention relates in general to tanks for storing gas, and more particularly to portable tanks for containing acetylene gas under pressure.

A convenient and efficient method of supplying automobiles and other vehicles with illuminated gas for their lamps, is to charge a portable tank containing an absorbent with acetylene gas under pressure, the capacity of the tank being increased by placing therein a solvent of the gas. In order that the tank may be charged with gas without generating a dangerous degree of heat the absorbent should be of such a character as to permit the free passage of the gas to every portion of the tank so that the pressure throughout the tank may increase uniformly.

The primary object of my invention is to provide an absorbent for a gas storage tank which may be readily inserted through a small hole in the tank, and which will permit the tank to be charged uniformly with gas throughout every portion of its interior, thereby avoiding unduly heating the tank when it is charged.

A further object of my invention is to provide a pressure-gage for gas tanks which will automatically prevent the over-charging of the tanks.

A still further object of my invention is to provide a portable gas tank of the type covered by my U. S. Patent 816,059, granted March 27, 1906, which will be simple in construction, inexpensive in manufacture, and efficient in use.

The embodiment of my invention herein disclosed may be generally described as comprising a tank having a hole in which an outlet valve is secured, a plurality of rods of absorbent material of a size to pass through the hole in the tank to the interior thereof, and a pressure gage having an outlet port closed by a plug of such material that it will be blown out when the tank has been charged to a maximum.

My invention will be more fully described hereinafter with reference to the accompanying drawing in which the same is illustrated as embodied in a convenient and practical form and in which—

Figure 1 is a longitudinal central section; Fig. 2 a cross section on line 2—2 Fig. 1; Fig. 3 an enlarged detail view of the pressure gage; Fig. 4 an enlarged cross section of a modified form of the absorbent rod; and Fig. 5 a view similar to Fig. 4 showing still another form of absorbent rod.

Similar reference characters are used to designate similar parts in the several figures of the drawing.

Reference character A represents a tank which may be of any desired construction but is preferably made of seamless steel.

B designates the end wall of the tank which is preferably counter-sunk to form a chamber in which is located a pressure gage C.

The pressure gage communicates with the interior of the tank by means of a tube in screw-threaded engagement with a spud $c$, the latter being inserted through a hole in the end wall of the tank. The casing of the gage C is provided with a passage $c'$ leading to the expansible member $C^2$. The passage $c'$ extends to the exterior of the casing and is closed by a plug $C'$ of suitable material, preferably soft metal.

The end wall E of the tank which is preferably formed integrally with the cylindrical side walls, is provided with a hole $e$ interiorly screw-threaded. A valve casing F is adapted to be engaged with the screw-threaded opening $e$ so that the valve in the casing may control the passage of gas from the tank. The valve may be of any suitable construction and is preferably provided with perforated tubular extension G extending into the body of the tank.

Reference letter D designates a plurality of rods of absorbent material of a cross-section to permit their being severally inserted through the opening $e$ to the interior of the tank. The rods are of a length corresponding to the interior length of the tank so that when the tank has been filled with rods it will contain absorbent material throughout its interior. The absorbent rods may be solid as shown in Fig. 2, or may be in the form of tubes, as shown at D' in Fig. 4.

The rods may also, if desired, be square in cross-section as shown at $D^2$ in Fig. 5. The rods may be made of any suitable absorbing material such for instance as asbestos, wood-pulp, or any other fibrous material.

The manner of charging my improved tank and its operation are as follows: After the tank has been formed and the wall B secured therein the gage C is placed in position within the chamber formed by the end wall and in communication with the interior of the tank. The absorbent rods D are then inserted in the tank through the screw-threaded opening $e$. The rods, while substantially filling the interior of the tank, have spaces around the individual rods so as to permit the free passage of the gas to every portion of the tank. After the rods have been inserted in the tank a liquid solvent of the gas, such for instance, as wood-alcohol, carbon-bisulfid, petroleum, chloroform, or acetic acid, is poured through the opening $e$ and is absorbed by the rods. The valve F is then secured within the screw-threaded opening $e$ and gas stored in the tank. The gas is introduced under pressure so that the solvent will become supersaturated. When the tank has been charged with the desired pressure the valve is closed and the tank is ready for use. By opening the valve the gas passes from the tank and as the pressure within the tank decreases the gas is liberated by the solvent.

By forming the absorbent material in the shape of rods the tank may be uniformly charged with the gas as the rods even when square in cross-section do not lie so close together as to prevent the unobstructed passage of the gas to all portions of the surfaces of the rods throughout the tank. The danger of the absorbent material obstructing the passage of the gas to every portion of the tank and the consequent generation of heat is thereby avoided. Another advantage in using rods of absorbent material which may be inserted through the hole for the valve is that the tank may be completed and subjected to the usual hydraulic test before the absorbent material is inserted in the tank. The necessity of removing the water used in testing the tank by distillation is consequently rendered unnecessary as the water may be readily poured from the tank.

By extending the passage in the casing of the pressure gage to the exterior thereof and closing the same by a plug of suitable material the pressure gage not only records the pressure in the tank, but also serves to automatically prevent the over-charging of the tank, inasmuch as when a maximum degree of pressure has been attained the plug will be blown from the port and the gas allowed to escape.

From the foregoing description it will be observed that I have invented an improved gas tank containing absorbent material so arranged as to be inserted through the valve-hole in the tank and of such a character as to permit the free passage of the gas throughout the tank. It will be further observed that I have invented an improved pressure-gage for gas tanks which automatically prevents the over-charging of the tanks.

Having now fully described my invention, what I claim as new and desire to secure by Letters Patent is:

1. In an apparatus for storing and delivering gas, the combination with a tank having a comparatively small opening, a plurality of stiff rods of self-supporting absorbent material within said tank and of a size to pass through said opening, and a solvent of the gas to be stored with which said rods are saturated.

2. In an apparatus for storing and delivering gas, the combination with a tank having a comparatively small opening through a wall thereof, of a valve device for controlling the discharge of gas from the tank and having a portion secured in said opening, a plurality of rods of absorbent material within said tank and of a size to pass through said opening, and a solvent of the gas to be stored with which said rods are saturated.

3. In an apparatus for storing and delivering gas, the combination with a cylindrical tank having end walls closing the same, one end wall having a comparatively small opening therethrough, a valve device for controlling the discharge of gas from the tank and having a portion secured in said opening, a plurality of rods of absorbent material corresponding in length to the interior length of said tank and of a size to pass through said opening, and a solvent of the gas to be stored with which said rods are saturated.

In testimony whereof, I sign this specification in the presence of two witnesses.

PERCY C. AVERY.

Witnesses:
GEO. L. WILKINSON,
HARRY S. GAITHER.